US007249773B2

(12) United States Patent
Schreiber et al.

(10) Patent No.: US 7,249,773 B2
(45) Date of Patent: Jul. 31, 2007

(54) ANGLE ADJUSTABLE CAMBER

(75) Inventors: Philip H. Schreiber, Denver, CO (US); Steven L. Lindquist, Broomfield, CO (US); Allen Killebrew, Erie, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 11/218,451

(22) Filed: Sep. 2, 2005

(65) Prior Publication Data

US 2006/0049593 A1 Mar. 9, 2006

Related U.S. Application Data

(60) Provisional application No. 60/608,259, filed on Sep. 9, 2004.

(51) Int. Cl.
*B60G 7/02* (2006.01)

(52) U.S. Cl. ................................................. 280/86.751

(58) Field of Classification Search ........... 280/86.751, 280/86.753, 250.1, 304.1; 301/111.06; 403/374.1
See application file for complete search history.

(56) References Cited

U.S. PATENT DOCUMENTS 6,974,194 B2 * 12/2005 Schreiber et al. ........ 280/250.1

* cited by examiner

*Primary Examiner*—Faye M. Fleming
(74) *Attorney, Agent, or Firm*—MacMillan, Sobanski & Todd, LLC

(57) ABSTRACT

An angle adjustable camber assembly is adapted to support the wheel of a wheelchair having a seat, the rear of which is at a given rear seat height. The assembly comprises a movable member for supporting the wheel. The movable member is adapted to translate and rotate so as to be able to selectively position the wheel at any one of a variety of camber angles while substantially maintaining the rear seat height and a spacing between the top of the wheel and the seat frame.

25 Claims, 2 Drawing Sheets

ANGLE ADJUSTABLE CAMBER

CROSS REFERENCE TO RELATED APPLICATIONS

This application claims the benefit of U.S. Provisional Patent Application No. 60/608,259, filed on Sep. 9, 2004.

BACKGROUND OF INVENTION

This invention relates in general to land vehicles and more particularly, to personal mobility vehicles. Most particularly, the invention relates to camber assemblies for wheelchairs.

Frequently, the rear wheels of a wheelchair are cambered, or angled with respect to a vertical plane. A wheelchair with a large camber angle has more responsive turning, and is typically beneficial in sports applications. A wheelchair with little to no camber has a smaller overall width and thus increased maneuverability in tight confines. Wheelchairs with adjustable camber are well known in the art. Adjustable camber allows the user to change the camber angle in order to adapt to a driving environment. A user would typically choose a small camber angle for indoor use, and a large camber angle for outdoor use. Changing camber alters several characteristics of the wheelchair due to the repositioning of the wheels. One undesirable consequence of changing from no camber to a high camber angle is that the rear of the wheelchair is lowered. This lowering not only alters the user's position, but also requires the front casters to be re-squared. Re-squaring the front casters is often a difficult adjustment. Another undesirable result of adjustable camber is that the tops of the rear wheels tend to tilt inward towards the centerline of the wheelchair, which changes the location of the tires and hand rims. To compensate for these changes, the rear axles must displace outward and downward as the camber angle increases. There are several wheelchairs available that offer two or more camber angles while addressing these issues with limited success. One such wheelchair is described in U.S. Pat. No. 6,311,999. In this invention, the height of the rear of the wheelchair changes as the camber angle is changed, requiring that the front casters be re-squared during such adjustment.

What is needed is a wheelchair that offers the user a wide range of camber angles, is quickly and easily adjusted without having to re-square the casters, and that compensates for the change in position of the wheel.

SUMMARY OF INVENTION

The present invention is directed towards an angle adjustable camber assembly that meets the foregoing needs. The assembly is adapted to support the wheel of a wheelchair having a seat, the rear of which is at a rear seat height. The assembly comprises a movable member for supporting the wheel. The movable member is adapted to translate and rotate so as to be able to selectively position the wheel at any one of a variety of camber angles while substantially maintaining the rear seat height and spacing between the top of the wheel and the seat frame.

Various objects and advantages of this invention will become apparent to those skilled in the art from the following detailed description of the preferred embodiment, when read in light of the accompanying drawings.

DETAILED DESCRIPTION

Figure 2:
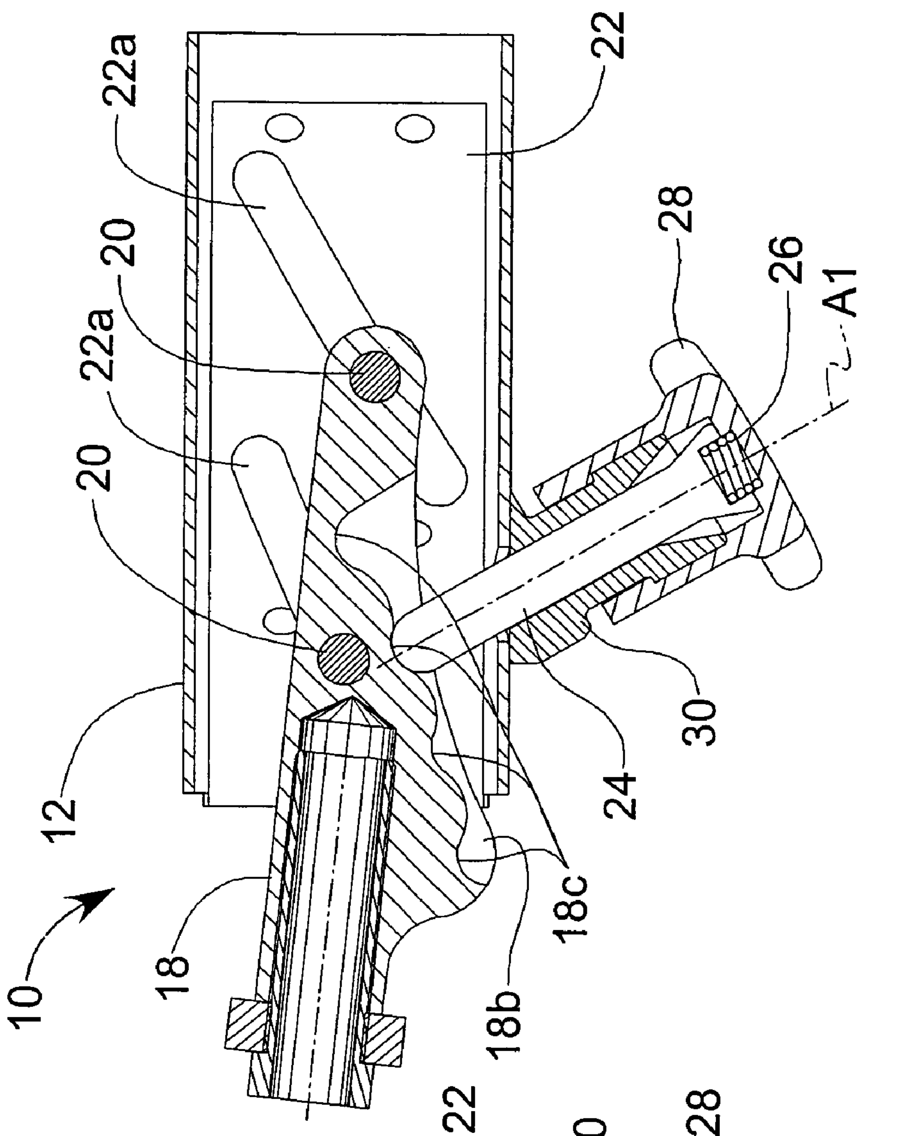
FIG. 2 is a cross-sectional view of the angle adjustable camber assembly taken along the line 2-2 in FIG. 1.
Figure 1:
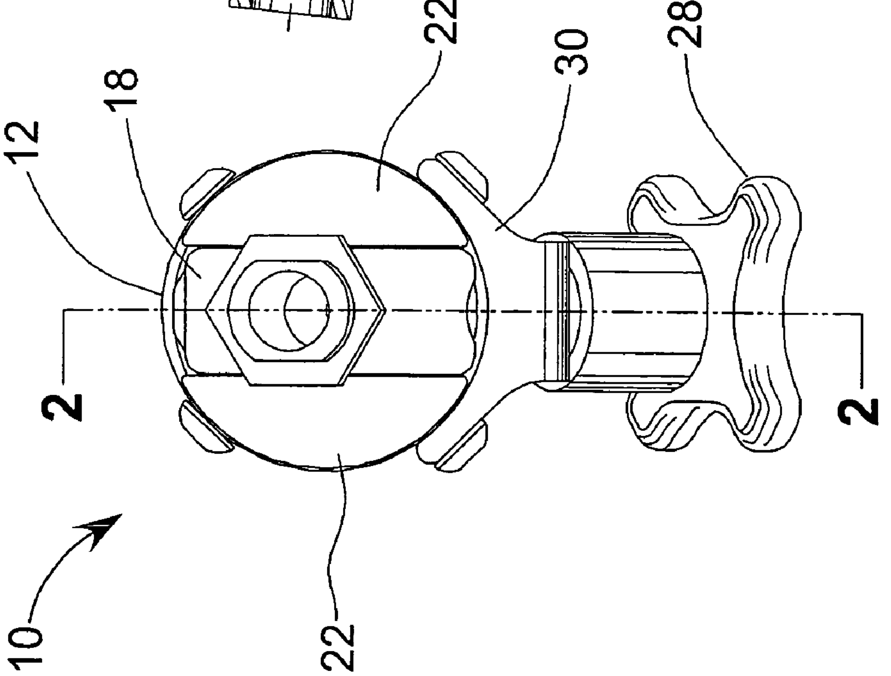
FIG. 1 is a side elevational view of an angle adjustable camber assembly according to the invention.
Figure 3:
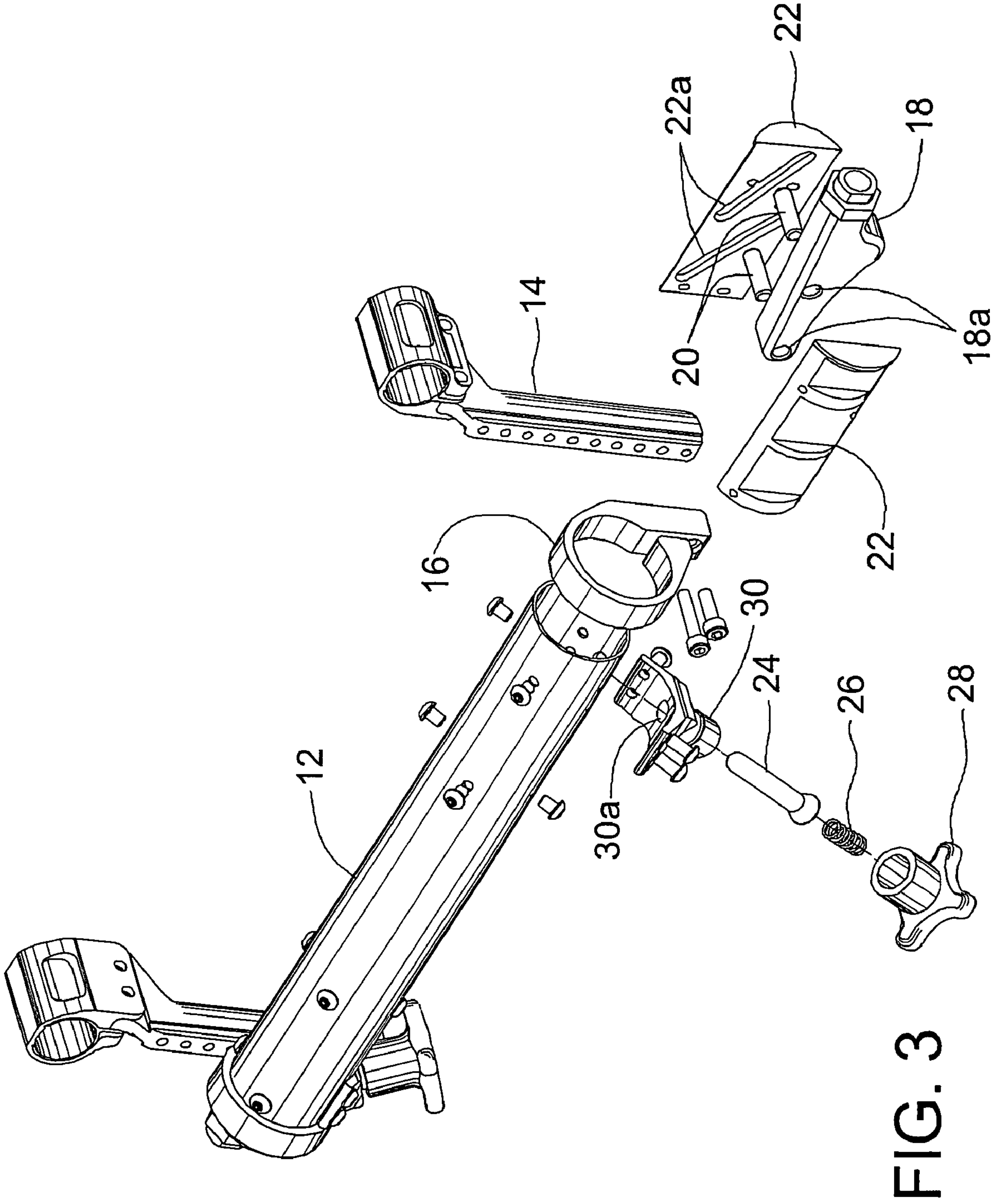
FIG. 3 is an exploded rear perspective view of the angle adjustable camber assembly shown in FIGS. 1 and 2.

Referring now to the drawings, there is illustrated in FIGS. 1-3 an angle adjustable camber assembly 10 that is a lightweight means of changing camber, preferably between 0°, 3°, 6° or 9° camber, quickly and easily, and preferably without tools. The assembly 10 is adapted to reposition the rear wheel axles (not shown) of a wheelchair so that the positions of the rear seat height and the handrim of the rear wheels (neither of which are shown) do not change as camber angle changes. The assembly 10 can be an option that mounts to and has substantially the same adjustment features as the axle plate assembly described in copending U.S. Provisional Patent Application No. 60/608,604, filed Sep. 10, 2004, the subject matter of which is incorporated herein by reference. The assembly 10 generally comprises a large diameter camber tube 12 that is adapted to be secured to the axle plate 14 using, for example, large diameter camber tube clamps 16, as shown in FIG. 3. The rear wheel axle is adapted to be attached to, or otherwise supported by an axle slide 18, or other movable member, that assumes a plurality of positions, such as the four positions shown, within the camber tube 12 to establish, for example, the four camber angles described above. As the slide 18 moves from, for example, the 0° to 3° to 6° to 9° positions, the slide 18 translates outward and downward and changes angle in order to maintain a substantially constant rear seat height and wheel handrim position. The slide 18 preferably has two cross-holes 18*a* (see FIG. 3) that preferably have dowel pins 20 pressed therein so that opposing ends of the dowel pins 20 protrude substantially an equal distance beyond the thickness of the slide 18. A guide assembly preferably includes two guides 22 that are substantially fixed to the sides of the interior of the camber tube. The guides 22 create a cavity where the slide 18 resides. These guides 22 preferably have two arc shaped tracks 22*a* that capture the ends of the dowel pins 20, and control the path of the slide 18 as the slide 18 moves from one camber angle setting to another. An index pin 24 engages with a groove 18*b* (see FIG. 2) on the underside of the slide 18. The groove 18*b* has a series of peaks and valleys 18*c* (see FIG. 2). The four valleys 18*c* are positions where the index pin 24 settles when the slide 18 is located at the discrete (i.e., 0°, 3°, 6° or 9°) camber position. The index pin 24 is loaded by a compression spring 26 that biases the index pin 24 into engagement with one of the four valleys 18*c*. The compression spring 26 is held captive between the index pin 24 on one end, and a set knob 28 on the other end. The set knob 28 is adapted to be loosened to change camber angle, and tightened to lock the assembly 10 into a selected camber angle. The set knob 28 is preferably adapted to be threadably engaged with a pin carriage 30 that is substantially fixed relative to the camber tube 12. The pin carriage 30 has a central bore 30*a* (see FIG. 3) that may capture the outer diameter of the index pin 24, restricting the index pin 24 to motion along the axis A1 of the index pin 24. When the set knob 28 is tightened, the set knob 28 contacts the lower end of the index pin 24 and pushes the index pin 24 into engagement with one of the valleys 18*c*. When the set knob 28 is loosened, the index pin 24 remains biased towards engagement with the groove 18*b* due to the compression force of the spring 26, but has sufficient clearance to rise and fall over the peaks and valleys 18*c*. To change camber angle position, the user may loosen the set knob 28 and push or pull on the rear wheel or slide 18. An indexed clicking is felt as the index pin 24 settles into the valleys 18*c*. The user may tighten the set knob 56 to locking the index pin 24 into engagement with a selected valley 18*c*, thereby taking any play out of the assembly 10.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An adjustable camber assembly for supporting the wheel of a wheelchair having a seat the rear of which is at a rear seat height, the assembly comprising:

a camber tube; and a movable member for supporting the wheel, the movable member being adapted to translate and rotate so as to be able to selectively position the wheel at any one of a variety of camber angles while substantially maintaining the rear seat height and spacing between the top of the wheel and the seat frame.

2. The assembly according to claim 1, wherein the movable member is a slide that is adapted to translate within guides that are adapted to be supported within a camber tube.

3. The assembly according to claim 1, wherein movable member is a slide that is adapted to be attached to a camber tube that can rotate for toe-in or toe-out adjustment.

4. The assembly according to claim 1, wherein the movable member comprises a slide having a series of holes, any one of which is adapted to be engaged by a pin to fix the adjustable camber assembly at any one of the camber angles.

5. The assembly according to claim 1, wherein the movable member comprises a slide having a groove with a series of peaks and valleys within the groove, any one of the valleys being adapted to be engaged by a pin to fix the adjustable camber assembly at any one of the camber angles.

6. The assembly according to claim 5, wherein the pin is adapted to be held in engagement by a threaded fastener.

7. The assembly according to claim 5, wherein the pin is adapted to be held in engagement by a knob.

8. The assembly according to claim 5, wherein the pin is adapted to be held in engagement by a cam lever.

9. The assembly according to claim 5, wherein the pin is adapted to be biased by a spring into engagement with the valleys in order to index the slide to one of the variety of camber angle positions.

10. A wheelchair comprising:

a seat including a frame, having an outside thereof, and a rear elevated to a rear seat height;

a camber tube;

a wheel with a top thereof; and an adjustable camber assembly supporting the wheel, the assembly comprising a movable member that translates and rotates so as to selectively position the wheel any one of a variety of camber angles while substantially maintaining the rear seat height and spacing between the top of the wheel and the outside of the seat frame.

11. The wheelchair according to claim 10, wherein the movable member is a slide.

12. The wheelchair according to claim 11, wherein the slide is attached to a camber tube that can rotate for toe-in or toe-out adjustment.

13. The wheelchair according to claim 11, wherein the slide has a series of holes any one of which is adapted to be engaged by a pin to fix the adjustable camber assembly at any one of the camber angles.

14. The wheelchair according to claim 11, wherein the slide has a groove with a series of peaks and valleys within the groove, any one of the valleys being adapted to be engaged by a pin to fix the adjustable camber assembly at any one of the camber angles.

15. The wheelchair according to claim 14, wherein the pin is adapted to be held in engagement by a threaded fastener.

16. The wheelchair according to claim 14, wherein the pin is adapted to be held in engagement by a knob.

17. The wheelchair according to claim 14, wherein the pin is adapted to be held in engagement by a cam lever.

18. The wheelchair according to claim 14, wherein the pin is adapted to be biased by a spring into engagement with the valleys in order to index the slide to one of the variety of camber angle positions.

19. An adjustable camber assembly comprising:

a camber tube that is adapted to be secured to the axle plate of a wheelchair;

an axle slide to which a rear wheel axle is adapted to be attached, the slide having one of more cross-holes with dowel pins extending therethrough so that opposing ends of the dowel pins protrude beyond the opposing sides of the slide; and a cavity within the camber tube having an arc shaped track for capturing the ends each of the dowel pins, the arc shaped track controlling the path of the slide as the slide moves from one camber angle to another.

20. The assembly according to claim 19, further comprising an index pin that is adapted to engage a groove on an underside of the slide, the groove having valleys where the index pin settles when the slide is located at a discrete camber position.

21. The assembly according to claim 20, wherein the index pin is loaded by a compression spring that biases the index pin into engagement with one the valleys.

22. The assembly according to claim 21, wherein the compression spring is held captive between the index pin and a set knob.

23. The assembly according to claim 22, wherein the set knob is adapted to be loosened to change camber angle and tightened to lock the assembly into a selected camber angle.

24. The assembly according to claim 21, wherein the set knob is adapted to be threadably engaged with a pin carriage that is substantially fixed relative to the camber tube.

25. The assembly according to claim 24, wherein the pin carriage has a central bore that may capture the index pin to restrict the index pin to motion along an axis of the index pin.

* * * * *